July 27, 1926. 1,594,336
R. F. MEWES ET AL
PROCESS FOR SEPARATING GAS MIXTURES, MORE ESPECIALLY AIR OR OTHER
DIFFICULTLY LIQUEFIABLE GAS MIXTURES
Filed March 12, 1924 6 Sheets-Sheet 6

Inventors:
Rudolf Ferdinand Mewes,
Rudolf Karl Eduard Mewes,
By Byrnes, Townsend n Brickenstein,
Attys.

Patented July 27, 1926.

1,594,336

UNITED STATES PATENT OFFICE.

RUDOLF FERDINAND MEWES AND RUDOLF KARL EDUARD MEWES, OF BERLIN, GERMANY.

PROCESS FOR SEPARATING GAS MIXTURES, MORE ESPECIALLY AIR OR OTHER DIFFICULTLY LIQUEFIABLE GAS MIXTURES.

Application filed March 12, 1924, Serial No. 698,730, and in Germany February 16, 1922.

This invention relates to the separation of the constituents of gaseous mixtures, particularly air.

The object of the invention is a process of separation of the character referred to, which makes it possible to obtain the constituents to be separated, in a commercially pure condition.

Other more specific objects will appear from the detailed description in connection with the accompanying drawings.

For the sake of brevity and simplicity we describe the invention as a process of separating oxygen and nitrogen from air, inasmuch as the commercial significance thereof exceeds that of the treatment of other gaseous mixtures. However, as is well understood, our process is not limited to the treatment of air, but applies to the separation of the constituents of gaseous mixtures in general.

Our invention, briefly expressed, consists in so conducting the process of rectification in a column, and more particularly in so correlating heat exchanges, pressure conditions and temperatures in different parts of a column that substantially pure oxygen and pure nitrogen are simultaneously produced in continuous operation.

For a simultaneous recovery of pure nitrogen and oxygen it is practically necessary to liquefy in the condenser more nitrogen and evaporate in the evaporator more oxygen than is theoretically necessary. This circumstance has the effect that under the usual conditions and in the ordinary practice it is not possible, even with two pressure stages, to simultaneously obtain pure nitrogen and pure oxygen.

Thus, in the operation of well known plants such as those of Linde and Claude, a recovery of substantially pure nitrogen is coincident with an oxygen yield containing 14–10% nitrogen, while a recovery of 98–99% oxygen is coupled with a nitrogen yield containing at least 3–4% oxygen. To avoid this disadvantage it has been proposed to withdraw from the column a 50% impure mixture of oxygen and nitrogen to obtain simultaneously 65% pure nitrogen and 7% pure oxygen. This represents a loss of 14% of the nitrogen and 14% of the oxygen introduced.

Our invention has a particular object of providing a process by which substantially pure oxygen and substantially pure nitrogen may be obtained in a continuous operation without the losses heretofore considered as unavoidable.

Figure 1:
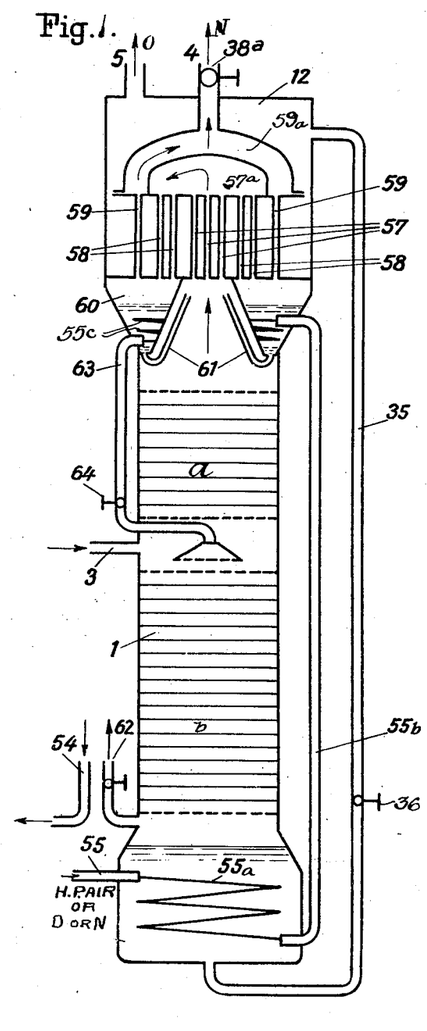
Figs. 1–7 and Figs. 9 and 10 are diagrammatic representations of constructions differing in various aspects but all based upon a common generic mode of operation to carry out the process according to the invention.
Figure 2:
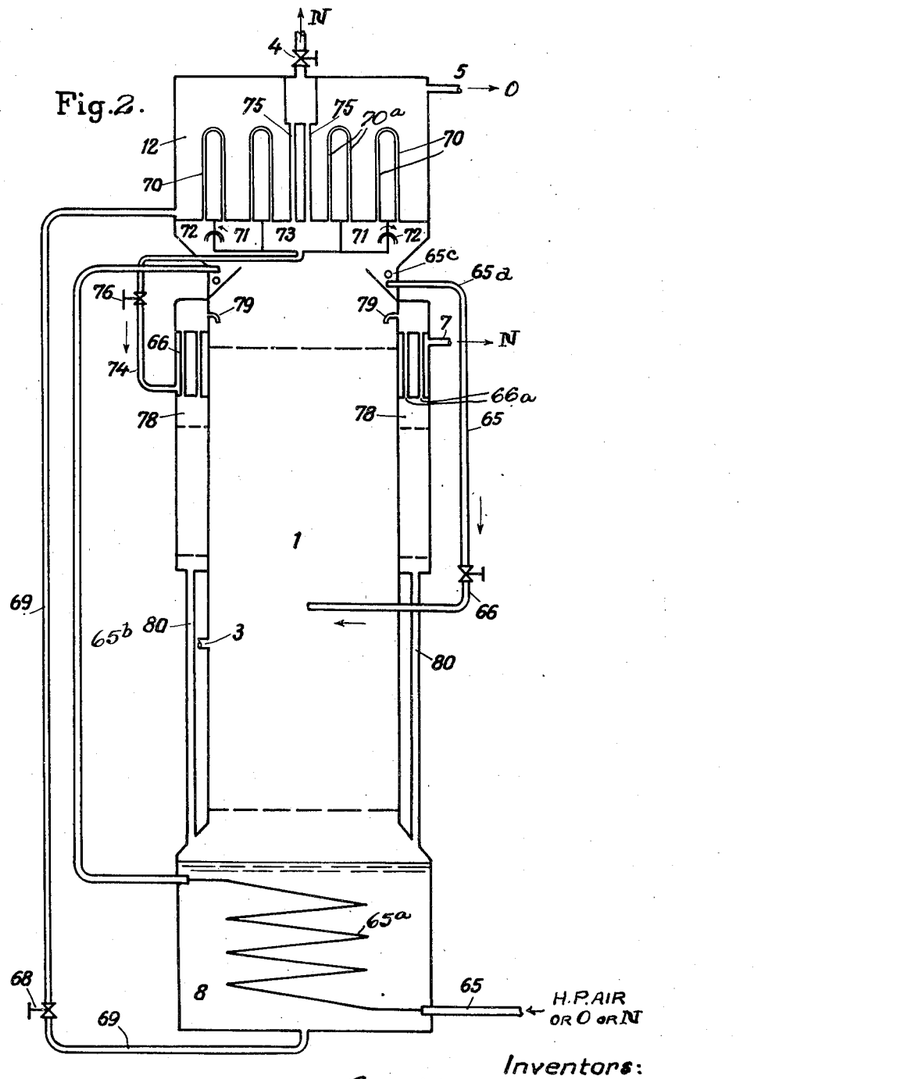
Figure 3:
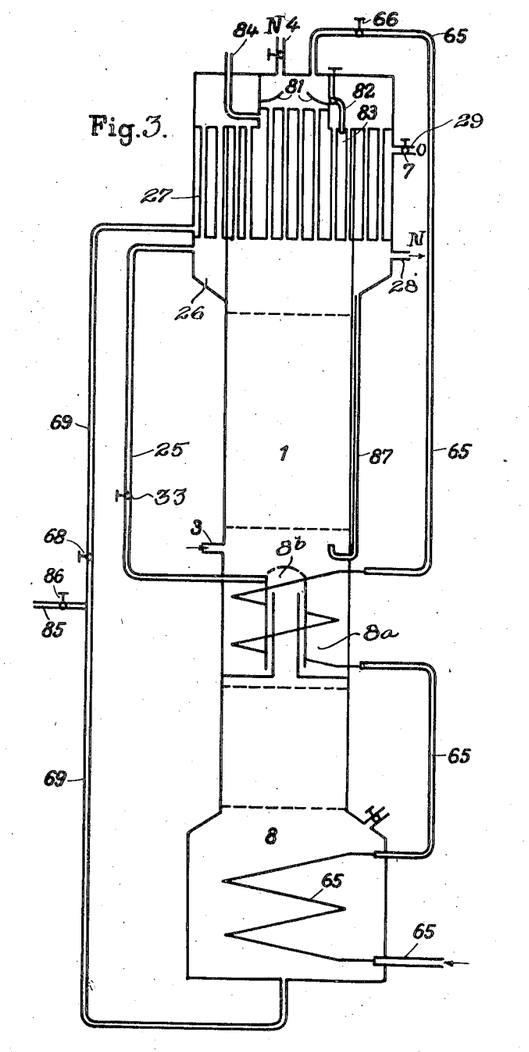

Having reference to the drawings, more particularly Figs. 1–3, separation is effected in the column under superatmospheric pressure of about 4–10 atm. or more. The air, after purification in the well known manner, is passed through a counter-current heat exchanger, generally well known in the art and therefore not shown, to nearly its saturation temperature and enters the column 1 through the inlet 3. At the bottom of the column is the oxygen pool 8, usually referred to as the evaporator, while at the top is the liquefier or condenser 12 for a purpose to be more fully described. From the bottom of the pool 8 a conduit 35 controlled by a valve 36 leads to the liquefier 12, whereby the liquid oxygen is forced under the pressure in the column 1 to rise in the conduit 35 and after expansion to nearly atmospheric pressure enters the liquefier 12.

The liquefier 12 which serves the purpose of liquefying part of the gases rising from the column, contains a plurality of passages 57, 58 and 59 which are so interconnected as to define a tortuous path principally in up-and-down direction, constituting in essence a reflux condenser. Immediately below the liquefier is disposed a container 60 in direct communication with the passages 58 and 59, while the central passages 57 are in direct communication with the column through a central space about which the container 60 is disposed.

At the top the passages 57 and 58 terminate in a separate central gas space 57a, while the passages 59 terminate in a separate conduit 59a leading to the outlet 4 controlled by the valve 38a. The liquefier 12 has an outlet 5. From the bottom of the container 60 extend overflow pipes 61 upwardly into the central space below the passages 57.

A high pressure fluid circuit is established from a conduit 55 through a coil 55a in the pool 8, then through a connecting conduit 55b into and through a coil 55c in the container 60 and then through a conduit 63 controlled by a valve 64 into the column substantially at the level of the air inlet 3. The pool 8 has a valve-controlled outlet 62.

To bring the apparatus described up to normal operating condition, we preferably withdraw all or at least the greater part of the air from the column by means of a high-pressure compressor, not shown. The air is withdrawn through pipe 62 and first passed through a counter-current heat exchanger (not shown) and then flows through pipe 54 to the high-pressure compressor, from which it flows under high pressure through the heat exchanger into the high pressure conduit 55. After passing through the coil 55a in the oxygen pool 8 and through coil 55c in the container 60, the high pressure fluid is discharged into the column after expansion by valve 64. The liquid formed is collected in the pool 8 and then passes under the pressure of the column through pipe 35 and valve 36 by which it is throttled into the condenser 12 at substantially atmospheric pressure.

The gases rising in the column pass into the passages 57 where a part is liquefied and directly returned as liquid to the upper part of the column. The uncondensed gases pass through passages 57 into the gas space 57a and then downwardly through passages in which another part is liquefied and flows as liquid into the container 60 from which the liquid may be recurned through overflow pipes 61 to the upper part of the column where the liquid in its downward course exchanges liquid nitrogen for gaseous oxygen, as is well understood.

The gases not liquefied in passages 57, 58, 59, rise through passages 59 into the conduit 59a to the outlet valve 38a which is kept closed until the column is in normal operating condition. As soon as the pool 8 and the liquefier or condenser 12 are sufficiently filled with liquid, the valve 38a is opened and the gas which is substantially pure nitrogen is withdrawn and passed under the pressure of the column through the heat exchanger and then collected as final product.

The coil 55a is so constructed that its evaporating capacity is sufficient to produce the amount of oxygen vapor necessary for the operation of the column and of the oxygen circuit 35.

The coil 55c has the purpose of evaporating a part of the liquid in the container 60 and thereby disposing of an excess of liquid nitrogen collected in the container 60. During the normal operation of the column the compressed fluid passed through the high pressure conduit 55, coil 55a and coil 55c into the column at the level of the inlet 3 or below the latter, may be oxygen, air or nitrogen. Oxygen has the advantage that, due to its low critical point ($-110°$ to $-118°$) as against that of nitrogen ($-146°$), the high pressure fluid need not be pre-cooled to the same extent as nitrogen for the same purpose. It is furthermore practically feasible to evaporate more oxygen than is necessary for the production of substantially pure liquid oxygen in the pool 8 without impairing the separation of substantially pure nitrogen from the contents of the column in the upper part thereof, inasmuch as the liquid oxygen vapor is taken up by the high pressure compressor. In addition, due to the greater difference of temperature between compressed oxygen and boiling oxygen from the vaporized 8 ($28°-36°$) in comparison with nitrogen for the same purpose, a correspondingly smaller heat transfer surface is required.

In order to secure the desired result of simultaneously recovering substantially pure oxygen and substantially pure nitrogen, the vapor passing through the reflux condenser is forced to follow a prescribed path and the nitrogen-rich liquid collected in the container 60 is heated to partially evaporate it, while the remainder is returned to the upper part of the separation column. It is to be noted that the arrangement defines a plurality of distinct stages for the liquefaction and collection of nitrogen-rich liquid from the nitrogen-rich vapors and for the return of liquid from the second to the first stage or from the third to the second stage, respectively. Heat is applied at a place of collection where the liquid is nearly pure nitrogen, which in the particular instance is container 60. However, there is considerable latitude in this respect and the arrangement described is merely to illustrate one mode of execution.

The liquid oxygen in the liquefier 12 is vaporized and drawn off through the outlet 5.

Having reference to Fig. 2, high pressure air or as a substitute therefor, high-pressure nitrogen, after passages through a heat-exchanger (not shown) to pre-cool it, enters through pipe 65 and flowing through coil 65ª, pipe 65ᵇ, coil 65ᶜ and pipe 65ᵈ is throttled by means of valve 66 into the column at approximately the level of the air intake 3. The liquid oxygen collecting in the pool 8 under the separating pressure in the column rises in pipe 69 and expanded by valve 68 enters the liquefier 12 at the upper end of the column. The liquid oxygen is vaporized and issues at outlet 5 as pure gaseous oxygen.

The nitrogen-rich gases enter passages 70 and successively pass through these passages and through additional passages 70ª and 75 to the outlet 4. The passages 70 and 70ª, similar to the arrangement of Fig. 1, represent a multi-stage reflux condenser system. Part of the nitrogen-rich vapors is liquefied in the ascending legs of the passages 70 and returns directly to the column; another part is liquefied in the descending legs of the passages 70 and the ascending legs of the passages 70ª and is collected in a container 71; another part is liquefied in the descending legs of the passages 70ª and the passages 75 and collected in a container 73, while the unliquefied gases pass out through the outlet 4. Overflow pipes 72 return part of the liquid collected in the container 71 to the column. Part of the liquid collected in container 73 flows by gravity through pipe 74 controlled by valve 76 into a receptacle 66 forming an oxygen liquefier surrounding the upper end of the column and then escapes at atmospheric pressure through outlet 7 for collection. The liquefier 66 defines a number of vertical passages 66ª establishing communication between a gas space 78ª above and a gas space 78 below. Vapors rising from the oxygen-rich liquid in pool 8 flow through conduits 80 outside the column into the gas space 78 and then into the passages 66ª of the liquefier 66 where they are subjected to the cooling action of the vaporization of the liquid in the liquefier with the result that substantially pure liquid oxygen is returned to the pool 8, while the nitrogen-rich gas passes through the passages of the liquefier and is returned into the upper part of the column through conduits 79. The gases which are not liquefied after passage through the passages 70 and 70ª and the nitrogen vapors rising from the container 73 are substantially pure nitrogen, which escaping through the valve-controlled outlet 4 under pressure, are capable of doing work after being passed through the usual heat exchanger.

Figure 3 illustrates a variation in the process. The liquid nitrogen, which is expanded in the upper part of the column under the pressure of the column, is collected by the plates 81; a part is expanded to atmospheric pressure by valve 82 and passes into the centre condenser 83 and thence escapes through pipe 84. Liquid oxygen can be withdrawn through pipe 85, which branches off from pipe 69. The quantity of oxygen to be withdrawn is controlled by valve 86. The vaporizer of the column comprises the lower pool 8 and in addition a section 8ª separated from the former. The oxygen-rich vapors rising from the pool 8 are collected in the dome 8ᵇ and pass through pipe 25 controlled by a valve 33 into the vessel 26 immediately below the condenser 27. From the vessel 26 the liquid rich in oxygen flows back through pipe 87 into the column comprising the vaporizing section 8ª, while the resulting nitrogen vapor can be withdrawn from the vessel 26 through outlet 28. An outlet 29 allows the vapors from the liquid oxygen of the condenser 27 to draw off.

The nitrogen in pipe 65 passes through the pool 8, then through the vaporizing section 8ª and is thereafter throttled by valve 66 into the top of the column whereby as previously stated, the bulk of the liquid formed is received in the condenser 83, while the excess furnishes wash liquid.

If the liquid oxygen to be used for washing is introduced at the top into the lower or driving-off column, or even a little lower down, whilst the gaseous or liquid nitrogen is intended to enter the strengthening column at the top, the introduction of the liquid oxygen by the known method, in which the oxygen vapours to be liquefied are withdrawn right above the oxygen vaporizer, involves practical difficulties in the adjustment of balance between the upper and lower parts of the column, and such difficulties are still further increased by an auxiliary vaporizer provided between them.

Furthermore, apart from the foregoing the connection between the circulating nitrogen and the supply of cold which is necessary to make good the losses, is not perceived. In order to avoid these disadvantages the intermediate vaporizing operation is omitted and the total output of the vaporizer is produced solely in the lower vaporizer by the compressed nitrogen, and the liquid nitrogen thus produced is fed into the upper part of the strengthening column expanded to the pressure in the separator. The oxygen to be liquefied in the condenser is carried from the space above the liquid oxygen in the lower vaporizer into the condenser; it is there liquefied and is then returned, not to a position above the vaporizer, but to its original position over the surface of the liquid of the vaporizer. In this connection it is advantageous to divide the vaporizer into two parts connected together, to withdraw the vapours above the part which is richest in oxygen and to allow the liquid to return into the other part, in order that it may then return to the second part after the small quantity of nitrogen in it has been removed. By this means it is possible to produce balance in the column more particularly, however, at the point between the two parts of the column where the fresh low-compressed air passes out of the exchanger into the dividing column, that is to say, the condenser surfaces for the washing oxygen and nitrogen are brought immediately to that relationship which corresponds to the balance of conditions at this point. This control can be best carried out when the quantity of compressed nitrogen is slightly in excess and all the washing nitrogen can be supplied from it to the top. In such case the condenser can be operated by all the liquid oxygen after expansion, and the same quantity of liquefied oxygen under the pressure of the dividing column can be returned to the point where it is produced, in such manner that a quantity of oxygen corresponding to the whole quantity of compressed nitrogen is vaporized in the vaporizer, and thus balance can be secured in the column. For all other quantities of nitrogen under pressure it is necessary to regulate the additional quantity of washing nitrogen and oxygen from case to case by the condition of the condenser surfaces if balance is to be secured in the column. Such regulation can also be secured by adjustment of the quantity of liquid in the vaporizer and by the size of the vaporizer surface.

It is important that the liquid oxygen, no matter whether it be withdrawn at the bottom from the vaporizer or some other point in a pure state or as a gas mixture and returned as liquid, is returned to the place where it is produced, for avoiding any disturbance of balance. In producing liquid oxygen it is most advantageous that it should be possible to carry the oxygen vapour directly from the vaporizer into the condenser and thence to take the liquid oxygen back into the vaporizer, the oxygen circulating in a path corresponding to that for the nitrogen, in the lower part of the dividing column but to charge the condenser with liquid nitrogen.

Figures 4, 5, 6:
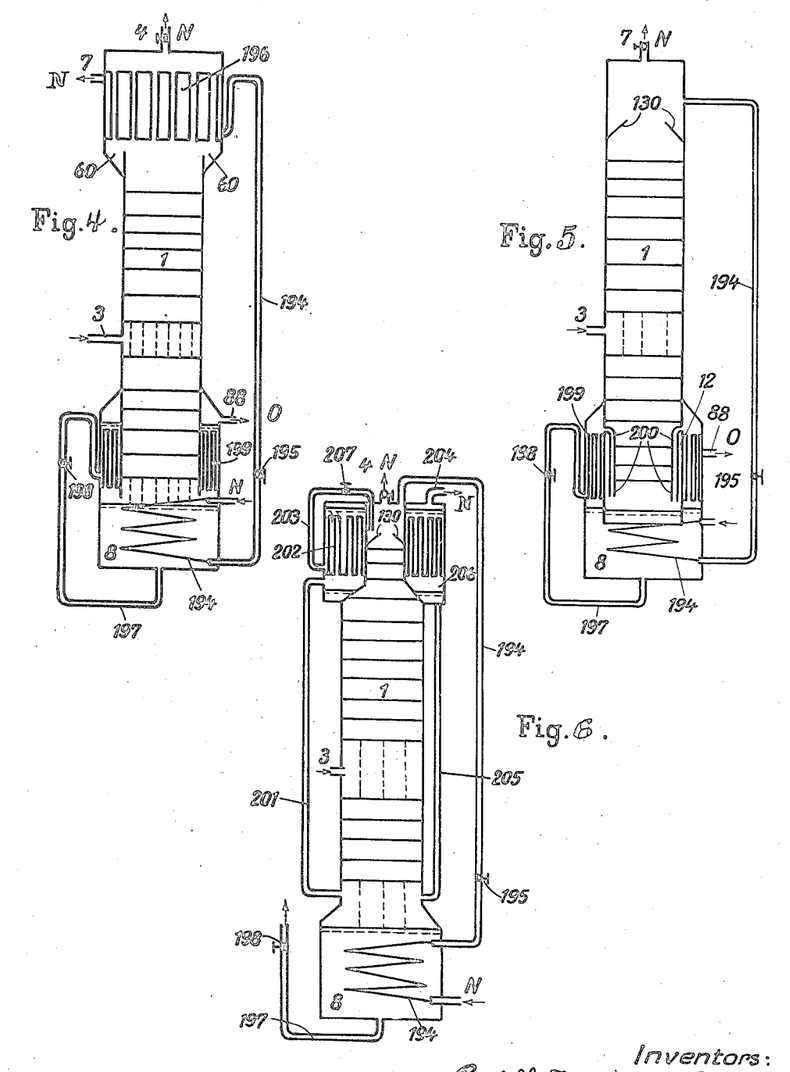

The operation is illustrated in the forms of construction shown in the diagrammatic Figures 4, 5 and 6.

According to Figure 4, the nitrogen is caused to circulate by surface condensation in a special condenser for the nitrogen, by means of the liquefied compressed nitrogen after its expansion. The oxygen is circulated by an ordinary liquefier 12, which is driven by expanded liquid oxygen. Gaseous pure oxygen can be withdrawn at 88. Compressed nitrogen is carried through the vaporizer 8 by means of the pipe 194 and is expanded by means of the valve 195, and it is thus allowed to pass into the condenser 196 which is disposed at the upper end of column 1. The liquid oxygen which collects at the bottom of the vaporizer 8 is expanded by pipe 197 and valve 198 and thus allowed to enter the oxygen condenser 199.

According to Figure 5, the circulation of the nitrogen produced by a mixing condensation without a special condenser, whilst the oxygen condenser is only slightly altered —that is to say, only in the pipe for the oxygen vapours that are to be liquefied. The volatile parts of the oxygen which rise above the condenser 199 are carried back through pipes 200 into the vaporizer 8.

According to Figure 6, a portion of the liquid nitrogen, corresponding to the quantity of the circulating oxygen flows out from the separator through a branch pipe, and after expansion it is used for driving the oxygen condenser. The alteration of construction illustrated in Figure 6 is such that the vapours which rise in the vaporizer 8 pass through pipe 201 into the collecting chamber 206 disposed above the column 1, and in which is provided the condenser 202. Part of the vapours become liquefied, whilst the vapours that carry the nitrogen with them are returned to the upper part of column 1 through pipe 203, in which a valve 207 is provided for regulating the quantity of gas passing through. Expanded gaseous nitrogen issues through the pipe 204 and passes to the place where it is to be used. Liquid oxygen is fed back through pipe 205 from the chamber 206 into the vaporizer 8. The liquid oxygen which collects at the bottom of the vaporizer 8 passes through pipe 197 and valve 198 to the exchanger.

In circulating the oxygen the liquid oxygen can be caused to circulate with it by the use of a so-called Dubion tubular pump.

Figures 7, 8, 9:
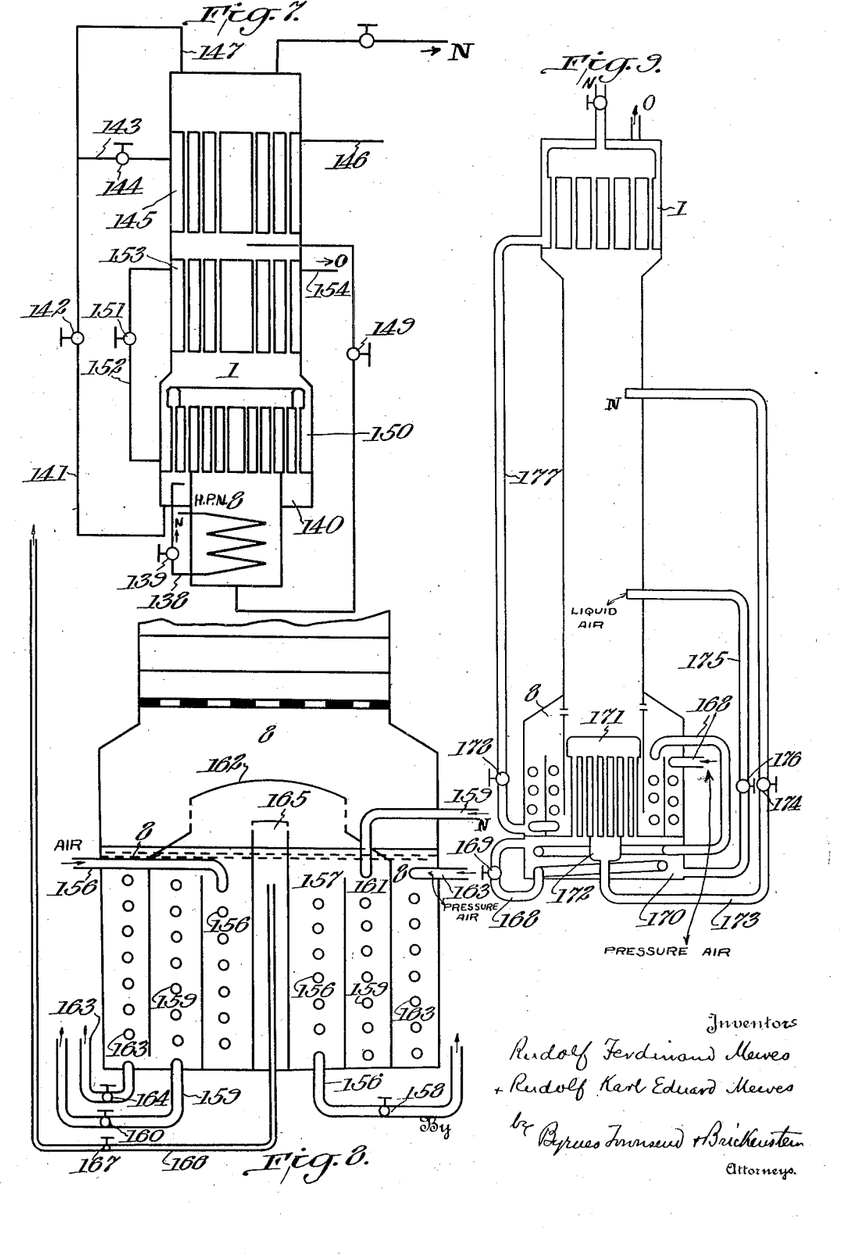
Fig. 8 is a diagrammatic representation of a detail arrangement that may advantageously be employed.

Fig. 7 illustrates the operation of the nitrogen condenser and the auxiliary oxygen condenser in accordance with the principle of liquid return together with application of heat.

The nitrogen from the compressor is carried by pipe 138 through the vaporizer 8 and is expanded by valve 139, to enter the space 140. The nitrogen which is used for heating the returned flow of liquid from the first stage is carried from this space 140 through pipe 141 and valve 142, to pipe 143, which is provided with valve 144, and thus into condenser 145, thence volatile nitrogen is carried from the upper part of column 1 through pipe 147 and pipe 143 into condenser 145 from which the nitrogen may be drawn off through outlet 146. The mixture of liquid oxygen and nitrogen which collects in vaporizer 8 is expanded through pipe 148 and valve 149 and enters the middle part of column 1. The liquid oxygen which collects on the bottom of condenser 150 passes through pipe 152 and valve 151 and enters condenser 153 expanded, from which point volatile oxygen issues forth through pipe 154.

In case pure oxygen and nitrogen is simultaneously required to be secured under pressure in a one-stage operation as well as in a series of separate operations at one or several pressures in the several divisions of the separating device, it has now been found that by the use of the so-called circulation of nitrogen or by filling up with liquid nitrogen, pure nitrogen can at any rate be secured in the process of separation from air, but the oxygen which is also secured cannot be obtained in a perfectly pure state but it always contains a proportion of about 10 to 15% of nitrogen.

In order to avoid this objection both in the one-stage process with circulating nitrogen as well as in the known method of working in two pressure stages, the liquid is positively guided in the vaporizer in which liquid oxygen or a mixture of liquids rich in oxygen collects through one or more vaporizing coils, so that the liquid, still rich in nitrogen, which passes down out of the separating column travels round the separate turns of the heating coil or coils from the outside inwards or vice versa from the inside outwards, the liquid passing down out of the column in the first case collects round the periphery of the vaporizer, but in the second case in the middle, but cannot enter directly at any other point, whilst the vapours which are developed at various points in the vaporizer are in communication with the vapour space below the separating column. The purpose of this is to secure that in the last position of the flowing liquid rich oxygen may collect and can be conducted in a liquid state into an ordinary condenser for washing-nitrogen or washing-oxygen, and there vaporized alone separated from the contents of the column, and vapours richer than nitrogen from the column itself can mix with the nitrogen but not by diffusion or the like.

The method by which the vaporizer liquid is carried in the described manner is a matter of no importance to the process. For example, it may be effected by the stream of liquid being diverted and turned back several times, as shown diagrammatically in the accompanying drawing for several vaporizer coils in working in one pressure stage with circulating nitrogen. The liquid which collects above the vaporizer and which still contains a little nitrogen here flows from the outside towards the inside and is carried off in the middle as pure liquid oxygen.

One example of this is illustrated in Fig. 8. Air of medium pressure enters pipe 156 in the direction indicated by the arrow, this pipe passing through the chamber 157 in the form of a helix, and it passes out in a liquid state and by means of the expanding valve 158 is conducted into the middle part of the column. Gaseous compressed nitrogen enters the outer space 161 of the hood 162 in the direction indicated by the arrow by means of pipe 159, the hood being surrounded by the pipe 159 which is in the form of a helix. The compressed nitrogen in the interim liquefies in pipe 159 and is expanded by valve 160 and enters the uppermost part of the column. Blast air enters vaporizer 8 in the direction indicated by the arrow by way of pipe 163, the pipe being coiled up in the vaporizer. The blast air liquefies in pipe 163 and by means of valve 164 is decompressed and enters the middle part of the separating column. The liquid oxygen which is formed in a very pure state in chamber 165 is passed to the point where it will be used through pipe 166 and valve 167.

The use of circulating nitrogen is superfluous in single or multiple columns of equal or unequal pressure, if the necessary heat is secured either by special heating by means of certain quantities of the operating medium, or of a constituent of the operating medium, or else is furnished by the mixture itself to be separated, in which case the mixture is pre-cooled to a corresponding higher temperature. The superfluous cold outside the exchanger which is made available by this means need not be lost completely; to the contrary it can and should be used for cooling the fresh mixture as far as possible. Although the thermal efficiency may by this means be lowered somewhat, the plant can in practice be so simplified by dispensing with a special nitrogen compressor, and the whole operation can be so well supervised, that the whole industrial efficiency may be considered as far superior to that of former processes. It is desirable and advantageous in the present process that in order to extract as pure high boiling point substance as possible in the vaporizer (in the case of air, oxygen) there is combined with the process the alternate vaporizing thereof in the bottom part of the vaporizer, as is shown in the diagrammatic forms of constructions shown in the accompanying drawings. An exchanger device and exchanging device are not illustrated in the drawings as they are generally known.

Figure 10:
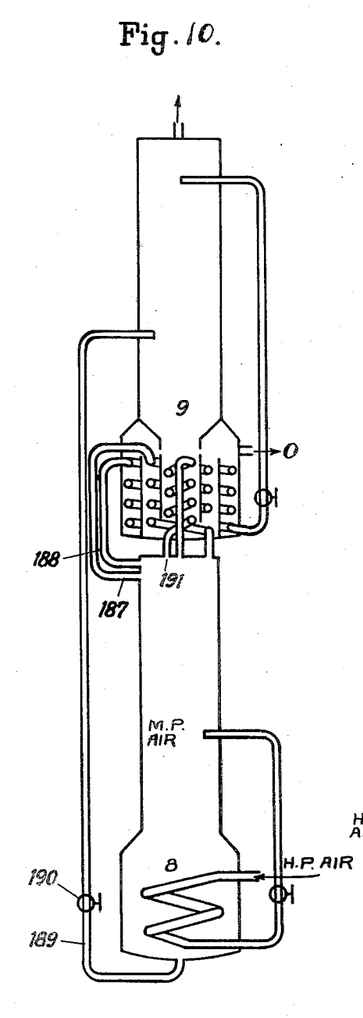
Figure 11:
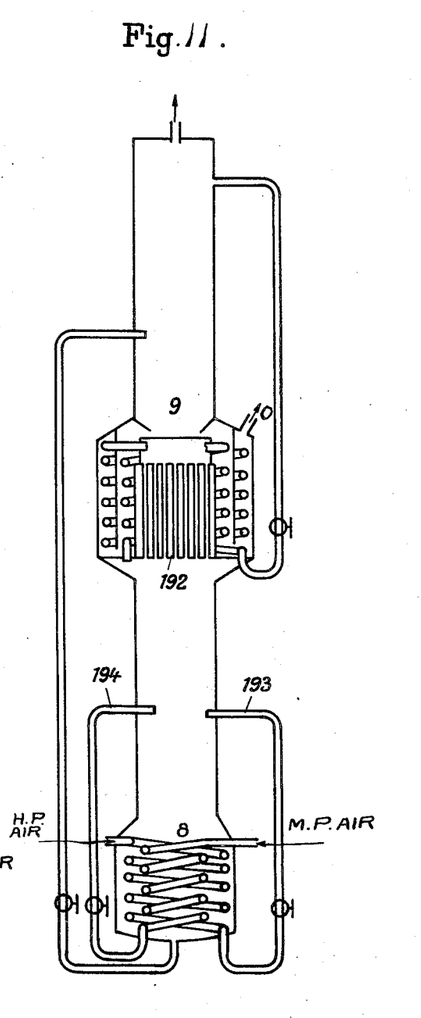
Fig. 11 is a modification of the construction shown in Fig. 10.

The method of operation is clear from Figs. 9, 10 and 11 of the drawings.

In the form of construction represented diagrammatically by Fig. 9 the compressed air at about 30 to 50 degrees enters the exchanger from a cooler not illustrated, is there precooled to a small degree and then while still comparatively warm is fed into the oxygen vaporizer in order to alternately vaporize the liquid oxygen and be partly liquefied. The compressed air passes on through pipe 168 and valve 169, is expanded and enters the lower vaporizer for the liquefied air 170, at a pressure which is higher than the pressure in vaporizer 8. The pressure in the latter must be at least 4 atmospheres super-pressure, that is to say there must be a pressure of 5 atmospheres, in order that the liquid oxygen expanded in condenser 171 can liquefy the compressed nitrogen in the upper part of the column. The pure gaseous compressed nitrogen there produced is conducted in known manner through the exchanger to the outside and is then used for producing work in an expansion device.

The vapours formed in the vaporizer 170 pass through the liquid return condenser 171, in which a mixture of liquids rich in oxygen returns to the vaporizer 170, whilst almost pure nitrogen collects in the chamber 172. The nitrogen is expanded by pipe 173 and valve 174 and enters the upper part of the separating column, whilst the liquid which collects in vaporizer 170 is expanded by pipe 175 and valve 176 and enters the middle or lower part of the separting column. The pure liquid oxygen which collects in vaporizer 8 is expanded by pipe 177 and valve 178 and enters the condenser 1 at the top of the column, and the oxygen vapour there produced is carried away through the exchanger to the outside and to the place where it is to be used.

Figs. 10 and 11 illustrate colmns of different pressures divided into two parts. Additional heating is secured in the case of the apparatus according to Fig. 10 in the vaporizer 9 of the low pressure column by means of low and medium pressure nitrogen entering the heating coils 187 and 188 from the pressure column, which nitrogen passes down into the pressure column and is partially vaporized in the vaporizer 8 by high pressure and medium pressure air, and it is expanded in parts with the liquid mixture from the vaporizer 8, entering the low pressure column through pipe 189 and valve 190, and is there completely vaporized.

The apparatus according to Fig. 11 operates in exactly similar manner, differing from the aparatus according to Fig. 10 only in that the middle additional heating spiral 191 is replaced by a tubular vaporizer 192 and there are disposed in the lower vaporizer 8 two vaporizing coils, namely a high pressure heating coil 193 and a medium pressure air heating coil 194.

It is important to the effective carrying out of the last described process that the alternating vaporization in the vaporizer 9 of the low pressure column can be used to the full extent. The surface of the separate heating coils is determined according to the normal quantity of highly compressed air or according to that of the low pressure air and high pressure air introduced, in order to secure stable working over a fairly wide range. The superfluous cold is likewise used for cooling fresh air in order to avoid any appreciable loss of cold.

Consideration must also be given to the fact that in expanding the liquid a part of it must be vaporized for cooling the liquid to boiling temperature.

What we claim is:—

1. In a process of separating a difficultly liquefiable gaseous mixture containing two principal constituents, of which one is more volatile than the other, into such constituents in a column operating under superatmospheric pressure, the steps which consist in producing at the top of the column more liquid of the more volatile constituent than is necessary for rectification, evaporating at the bottom of the column more liquid of the less volatile constituent than is necessary for rectification, preventing the excess of liquid produced at the top from reaching the bottom of the column by evaporating it and preventing the excess of liquid evaporated at the bottom from reaching the top of the column by liquefying it and causing it to return to the bottom of the column.

2. Process according to claim 1 in which the excess liquid of the more volatile constituent produced at the top of the column is evaporated in the column immediately below the level where it is produced.

3. Process according to claim 1 in which part of the vapors rising from the liquid at the bottom of the column are subjected to a condensing action effecting rectification so as to cause return of the liquid formed to the lower part of the column while permitting the uncondensed gas to pass to the upper part of the column.

4. Process according to claim 1 in which a part of the excess liquid of the more volatile constituent produced at the top of the column is expanded to substantially atmospheric pressure to form a condenser fluid in heat exchange relation with the contents in the upper portion of the column.

5. Process according to claim 1 in which the vapors rich in the more volatile constituent rising through the top of the column are caused to pass through a tortuous path leading successively in up and down direction.

6. In a process according to claim 1 wherein the vapors rich in the more volatile constituent rising through the top of the column are subjected to fractional condensation, the respective condensates separately collected and the condensate richest in the more volatile constituent is expanded to a lower pressure and brought into heat exchange relation, but out of physical contact with vapors rich in the less volatile constituent rising from the lower part of the column in such a way that the resulting liquid rich in the less volatile constituent returns to the bottom of the column while the uncondensed vapors rise to the upper part of the column.

7. In a process according to claim 1 wherein part of the vapors rising directly from the liquid rich in the less volatile constituent at the bottom of the column is separately conducted away, subjected to fractional condensation and the resulting liquid returned to the liquid at the bottom of the column, thereby establishing a continuous cycle of progressive purification.

8. In a process according to claim 1 wherein the vapors rising through the upper part of the column are subjected to fractional condensation, the condensates separately collected, the condensate richest in the more volatile constituent is expanded to substantially atmospheric pressure, vapors rising directly from the liquid at the bottom of the column are separately brought into heat exchange relation, but out of physical contact with the expanded condensate, whereupon the liquid resulting from the heat exchange is returned to the liquid at the bottom of the column.

9. In a process of separating a difficultly liquefiable gaseous mixture containing two principal constituents, of which one is more volatile than the other, into such constituents, the steps which consist in maintaining a rectification column under pressure so as to permit the withdrawal of the separate final products therefrom under superatmospheric pressure, conducting the heat exchange in the column so as to produce at the top more liquid of the more volatile constituent than is necessary for rectification and evaporate at the bottom more liquid of the less volatile constituent than is necessary for rectification, evaporating at least part of the excess liquid produced at the top and liquefying part of the excess vapor produced at the bottom and returning the liquid formed to the bottom.

In testimony whereof we have signed this specification.

RUDOLF FERDINAND MEWES.
RUDOLF KARL EDUARD MEWES.